(12) United States Patent
Tsujii

(10) Patent No.: US 10,873,181 B2
(45) Date of Patent: Dec. 22, 2020

(54) ELECTRONIC DEVICE AND CONTROL METHOD OF ELECTRONIC DEVICE

(71) Applicant: CANON KABUSHIKI KAISHA, Tokyo (JP)

(72) Inventor: Hiroto Tsujii, Matsudo (JP)

(73) Assignee: Canon Kabushiki Kaisha, Tokyo (JP)

(*) Notice: Subject to any disclaimer, the term of this patent is extended or adjusted under 35 U.S.C. 154(b) by 182 days.

(21) Appl. No.: 16/223,533

(22) Filed: Dec. 18, 2018

(65) Prior Publication Data

US 2019/0199088 A1 Jun. 27, 2019

(30) Foreign Application Priority Data

Dec. 21, 2017 (JP) .................................. 2017-245137

(51) Int. Cl.
*H02H 3/087* (2006.01)
*H02H 9/02* (2006.01)
*H02H 1/00* (2006.01)

(52) U.S. Cl.
CPC .......... *H02H 3/087* (2013.01); *H02H 1/0007* (2013.01); *H02H 9/02* (2013.01)

(58) Field of Classification Search
CPC .......... H02H 1/0007; H02H 7/22; H02H 3/08; H02H 3/087; H02H 9/02
See application file for complete search history.

(56) References Cited

U.S. PATENT DOCUMENTS

| | | | | |
|---|---|---|---|---|
| 6,064,554 A | * | 5/2000 | Kim ........................ | G06F 1/266 361/64 |
| 2003/0172318 A1 | * | 9/2003 | Sugita ..................... | G06F 1/266 714/25 |
| 2012/0198119 A1 | * | 8/2012 | Johnson .............. | G06F 13/4022 710/312 |
| 2013/0132758 A1 | * | 5/2013 | Shiba ...................... | G06F 1/266 713/340 |
| 2018/0150121 A1 | * | 5/2018 | Basterash ............... | G06F 1/266 |
| 2019/0319446 A1 | * | 10/2019 | Mondal ................ | H02H 1/0007 |

FOREIGN PATENT DOCUMENTS

JP 2003263373 A 9/2003

* cited by examiner

*Primary Examiner* — Gary L Laxton
(74) *Attorney, Agent, or Firm* — Venable LLP

(57) ABSTRACT

An electronic device having a plurality of external interfaces and capable of supplying a current to external devices connected via the external interfaces, respectively includes power supply control units corresponding to the respective external interfaces and a control unit having respective terminals for outputting a power supply control signal to the power supply control units. The control unit is configured to switch output of the power supply control signal for the power supply control unit corresponding to the selected external interface and control the power supply control signal for the power supply control units corresponding to the selected external interface to be switched off in a case where a state of the common overcurrent detection signal is changed in response to the switching of the output of the power supply control signal.

13 Claims, 8 Drawing Sheets

| USB PORT | COMMUNICATION STATUS |
|---|---|
| 1 | UNCONNECTED |
| 2 | CONNECTED |
| 3 | UNCONNECTED |
| 4 | UNCONNECTED |

FIG.8

ELECTRONIC DEVICE AND CONTROL METHOD OF ELECTRONIC DEVICE

BACKGROUND OF THE INVENTION

Field of the Invention

The present invention relates to a technique to control power (current) in an electronic device with a plurality of external connection interfaces.

Description of the Related Art

Conventionally, an interface under the Universal Serial Bus (USB) standard has become widespread as an interface for connecting an electronic device as an information processing apparatus to a peripheral. In addition to data communications, the USB standard specifies, as part of the specifications, that a power supply current can be supplied from an electronic device (information processing apparatus) to a target peripheral as bus power.

In a case of supplying power (current) via a USB interface compliant with this standard, an electronic device is mounted with a power supply capable of supplying suitable power (rated current) for ensuring the operation of a peripheral. However, even if a power supply is mounted in consideration of a peripheral to be connected, there are various peripherals and there is a possibility that a current beyond an acceptable value flows (that is, a possibility of overcurrent) depending on a peripheral connected. For protection against the overcurrent, it is common to mount a circuit for suppressing overcurrent (i.e., an overcurrent control circuit).

Further, in recent years, it is common to mount an electronic device with a plurality of USB ports as USB interfaces. In a case where a plurality of USB ports are mounted on an electronic device, it is necessary to provide an overcurrent control circuit for each USB port like an electronic device disclosed in Japanese Patent Laid-Open No. 2003-263373.

An electronic device equipped with systems on a chip (hereinafter referred to as "SOC") has also become widespread for controlling the operation of the entire electronic device. Since the number of terminals is generally limited in an SOC, if overcurrent control circuits are provided for respective USB ports, there is a case where all overcurrent control signals (power supply enable signals and overcurrent detection signals) cannot be allocated to terminals of a SOC.

In this case, a method of using a common overcurrent control signal for overcurrent control circuits and sharing the terminals in the SOC is considered. In this method, however, if the overcurrent detection signal is received, the SOC cannot specify a USB port in which overcurrent has occurred and may shut off power supply to not only the USB port in which the overcurrent has occurred but also normally operating USB ports, which results in a decrease in user convenience.

SUMMARY OF THE INVENTION

An electronic device of the present invention comprising a plurality of external interfaces and capable of supplying a current to external devices connected via the external interfaces, respectively. The electronic device comprising: power supply control units corresponding to the respective external interfaces and each configured to control whether to supply or shutoff a current to the external device and to output a detection of overcurrent supplied to the external device as an overcurrent detection signal; and a control unit having (i) a shared terminal for accepting input of an overcurrent detection signal from each of the power supply control units and (ii) respective terminals for outputting, to the power supply control units, a power supply control signal for instructing to control whether to supply or shutoff a current to each of the external devices, the control unit being configured to: select one of the external interfaces as a target of overcurrent detection in a predetermined order; switch output of the power supply control signal for the power supply control unit corresponding to the selected external interface; and control the power supply control signal for the power supply control unit corresponding to the selected external interface to be switched off in a case where a state of the common overcurrent detection signal is changed in response to the switching of the output of the power supply control signal.

Further features of the present invention will become apparent from the following description of exemplary embodiments with reference to the attached drawings.

BRIEF DESCRIPTION OF THE DRAWINGS

FIG. 8 is a diagram showing an example of a USB port status management table according to the embodiment.

DESCRIPTION OF THE EMBODIMENTS

Embodiments of the present invention will be described below with reference to the accompanying drawings. It should be noted that the configurations described in the embodiments are mere examples and are not intended to limit the scope of the present invention to them.

Embodiments

Figure 1:
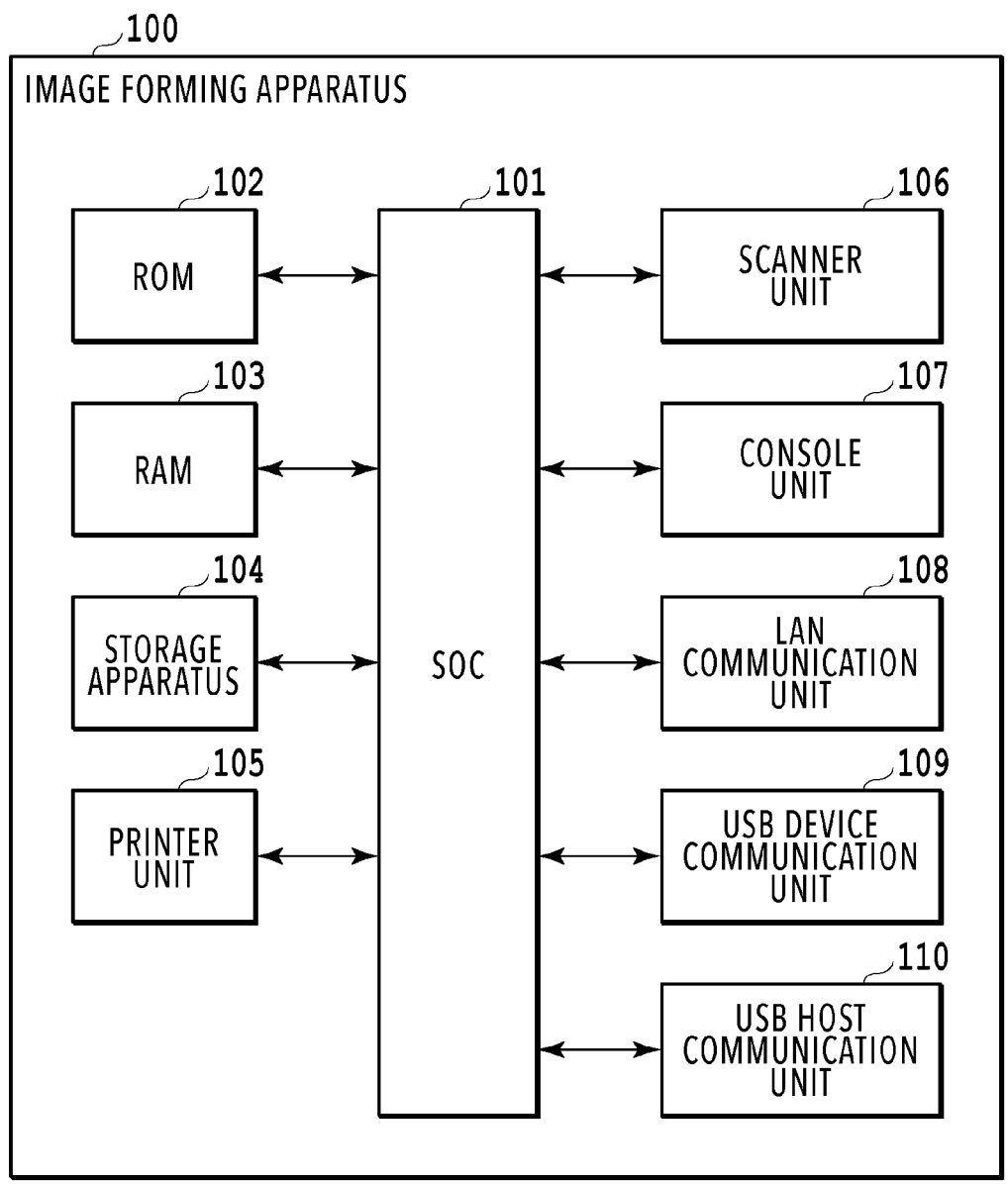
FIG. 1 is a diagram showing a hardware configuration example of an image forming apparatus according to an embodiment.

FIG. 1 is a block diagram showing a general hardware configuration of an electronic device comprising a plurality of USB ports (i.e., connection ports of an external interface). An image forming apparatus 100 comprising four USB ports will be described as an example of a general hardware configuration of an electronic device comprising a plurality of USB ports.

The image forming apparatus 100 is a multifunction peripheral (MFP) having multiple functions such as copy and fax functions, and is configured as follows for example. An SOC 101 is a main unit that includes a central processing unit (CPU) and controls the entire image forming apparatus 100, and comprises a controller for controlling each unit. The units are connected via various interfaces of the SOC 101.

A read-only memory (ROM) 102 is a memory for storing a program for activating the SOC 101, various types of setting information and the like. A random-access memory (RAM) 103 is a working memory for the operation of the SOC 101. The RAM 103 is used for loading various programs, storing operational processing results, and retaining (storing) image data subjected to image processing by performing operation such as printing or scanning.

A storage apparatus 104 is a nonvolatile memory for storing programs and data of a large data size. The storage apparatus 104 includes, for example, a hard disk drive (HDD), a solid state drive (SSD), and a flash memory. In the description below, the RAM 103, the storage apparatus 104 and the like may be collectively referred to as "a storage area."

A printer unit 105 is a unit operated by an exchange (transmission/reception) of image data and control signals with the SOC 101 and includes various devices related to printing operation such as a photoconductor drum, a laser oscillator, a toner fuser, and a motor. A scanner unit 106 is a unit operated by an exchange (transmission/reception) of control signals related to reading operation with the SOC 101 and includes various devices such as an original detection sensor, a reading sensor, and a motor. A console unit 107 receives image data for display from the SOC 101 and displays the image data on a screen. In addition, the console unit 107 receives user operation via a touch panel, a key or the like and transmits a control signal corresponding to the operation to the SOC 101. Upon the receipt of a control signal from the console unit 107, the SOC 101 changes the image data to be displayed and executes a predetermined function (such as a copy function) based on the control signal.

A LAN communication unit 108 includes a network controller and a wired LAN interface and is connected to an external device via a local area network (LAN) cable to perform network communication. The connection to an external device is not limited to a wired one and may be wireless.

A USB device communication unit 109 includes a USB device controller and a USB device interface (e.g., Type B). The USB device communication unit 109 is connected to a USB host interface (e.g., Type A) of a personal computer as an external device via a USB cable to perform communication under the USB standard.

A USB host communication unit 110 includes a USB host interface (e.g., Type A), a power supply IC for supplying power to a connected device and the like. The USB host communication unit 110 is connected to an external device having a USB device interface (e.g., Type B) via a USB cable to perform communication under the USB standard.

Figure 2:
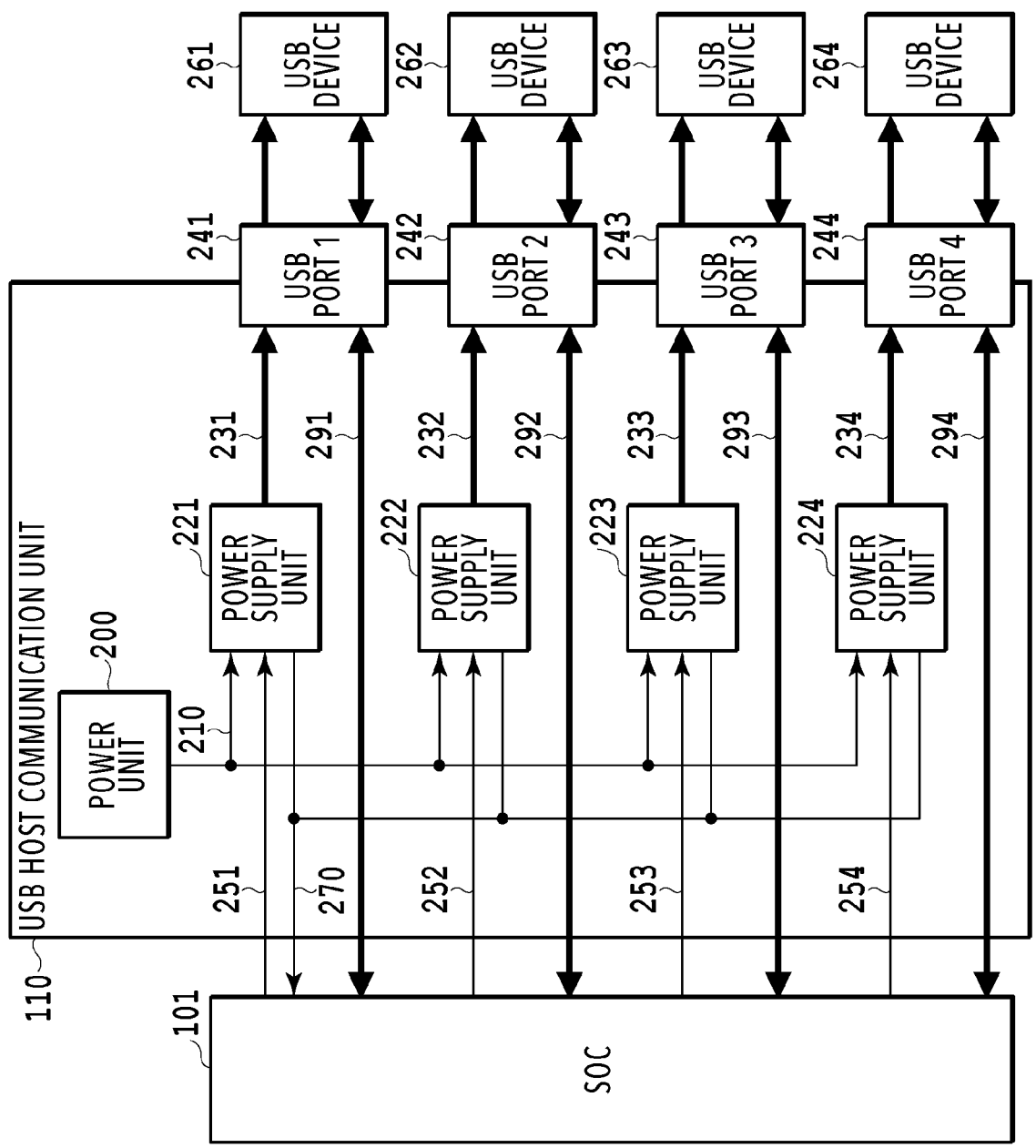
FIG. 2 is a diagram showing a detailed configuration example of a USB host communication unit according to the embodiment.

FIG. 2 is a block diagram showing a detailed configuration example of the USB host communication unit 110 according to the present embodiment. The configuration of the USB host communication unit 110 will be described below in detail with reference to FIG. 2.

A power unit 200 is a unit that converts input AC power into DC power and supplies the converted DC power to each unit of the image forming apparatus 100. In the block diagram of FIG. 2, the power unit 200 supplies USB upstream power 210 to power supply units (power supply control units) 221 to 224. Power supplied to units other than the power supply units 221 to 224 is not shown in the drawings and the description thereof is omitted since it is not the main focus of the present embodiment. The power supply units 221 to 224 are blocks for controlling on and off of the power supplied from the power unit 200 to the USB ports 241 to 244.

In the configuration shown in FIG. 2, the power supplied to the USB ports 241 to 244 is indicated by the USB upstream power 210 on the input side and USB downstream power 231 to 234 on the output side of the power supply units 221 to 224. The power supply units 221 to 224 control power supply (on or off) to the USB ports 241 to 244 based on power supply control signals 251 to 254 transmitted from respective terminals in the SOC 101, respectively. For example, upon detecting that the power supply control signals 251 to 254 are changed to the enable side, the power supply units 221 to 224 control the internal connection to be switched on and supply power to the USB downstream power 231 to 234. The power supply units 221 to 224 also have the function of outputting the presence or absence of detection of overcurrent supplied to USB devices 261 to 264 as an overcurrent detection signal 270. In a case where a predetermined current threshold is exceeded, the power supply units 221 to 224 change the overcurrent detection signal 270 to the enable side and notifies the SOC 101 that overcurrent has occurred. The overcurrent detection signal (also referred as the common overcurrent detection signal) 270 is shared by the power supply units 221 to 224. The common overcurrent detection signal 270 is input to a shared terminal in the SOC 101.

The USB ports 241 to 244 are USB connectors (Type A) for connecting external devices having USB interfaces to the image forming apparatus 100. The USB devices 261 to 264 are USB devices that are connectable to USB connectors (Type A). Each of the USB devices 261 to 264 may be, for example, a USB memory, a USB card reader, or a portable HDD connected via a USB cable. USB communication signals 291 to 294 are electrical signals transmitted and received between the SOC 101 and the USB devices 261 to 264 for data communication under the USB standard.

Figure 3:
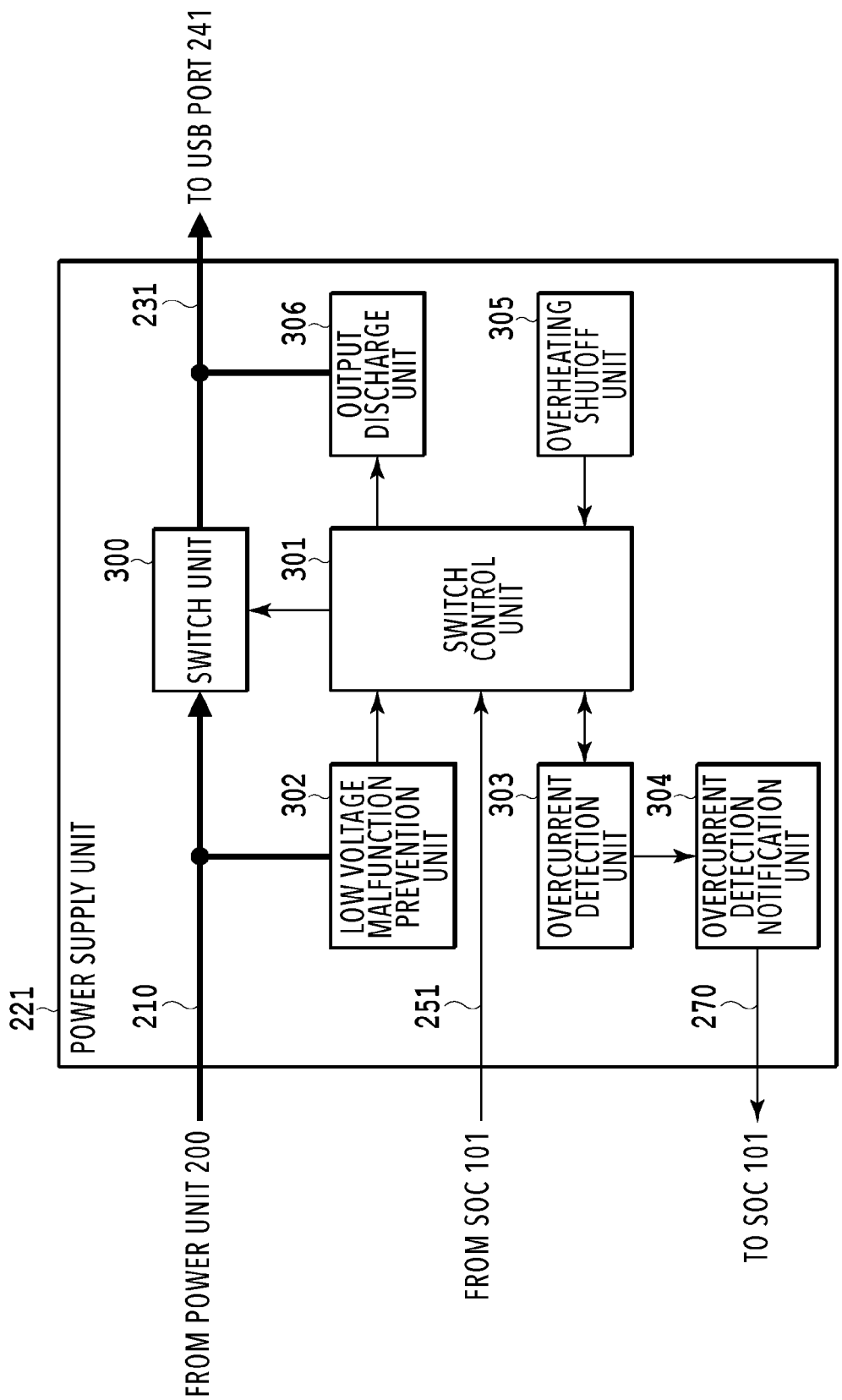
FIG. 3 is a diagram showing a detailed configuration example of a power supply unit according to the embodiment.

Next, the internal configuration of the power supply unit 221 in the electronic device of the present embodiment will be described in detail with reference to FIG. 3. The description of the power supply units 222 to 224 will be omitted since each of them has the same internal configuration as that of the power supply unit 221.

A switch unit 300 is a circuit that controls continuity between the USB upstream power 210 and the USB downstream power 231 based on a signal from a switch control unit 301. The switch control unit 301 includes, for example, a switching element such as an FET.

The switch control unit 301 is a circuit that generates a signal for controlling continuity of the switch unit 300 and includes, for example, a charge pump circuit and a gate logic circuit. More specifically, the switch control unit 301 controls continuity of the switch unit 300 based on the power supply control signal 251 and notifications from a low voltage malfunction prevention unit 302, an overcurrent detection unit 303, and an overheating shutoff unit 305, which will be described later. In addition, in a case of controlling the switch unit 300 to be in a non-conducting state, the switch control unit 301 makes a notification to an output discharge unit 306, thereby controlling discharge of the USB downstream power 231.

The low voltage malfunction prevention unit 302 is a low voltage detection unit and is a circuit that makes a notification to the switch control unit 301 in a case where the voltage of the USB upstream power 210 (i.e., input voltage) decreases to a predetermined voltage value or less. The switch control unit 301 controls the switch unit 300 to be in a non-conducting state upon the receipt of the notification from the low voltage malfunction prevention unit 302 that the voltage of the USB upstream power 210 is equal to or less than the predetermined voltage value.

The overcurrent detection unit 303 is a circuit that makes a notification to the switch control unit 301 and an overcurrent detection notification unit 304 in a case where a current value of a current flowing as the USB upstream power 210 or the USB downstream power 231 is equal to or greater than a predetermined threshold. Upon the receipt of the notification from the overcurrent detection unit 303 that the current having the current value equal to or greater than the threshold is flowing, the switch control unit 301 brings the switch unit 300 into a semi-conducting state, thereby regulating the current flowing as the USB downstream power 231. As a supplement, the semi-conducting state means a state where a current supplied to the USB devices 261 to 264 is regulated to be less than a threshold of being detected as overcurrent. While the overcurrent condition continues, the overcurrent detection unit 303 keeps notifying the overcurrent detection notification unit 304 that the current equal to or greater than the threshold is flowing. After the overcurrent condition is removed, the overcurrent detection unit 303 stops notifying the overcurrent detection notification unit 304 that the current equal to or greater than the threshold is flowing.

The overcurrent detection notification unit 304 is a circuit that outputs the overcurrent detection signal 270 to the SOC 101 in a case where the overcurrent detection notification unit 304 is notified by the overcurrent detection unit 303 that the current equal to or greater than the threshold is flowing. The overcurrent detection notification unit 304 includes, for example, an open drain FET. While the overcurrent detection unit 303 keeps notifying that the current equal to or greater than the threshold is flowing, the overcurrent detection notification unit 304 keeps outputting the overcurrent detection signal 270 to the SOC 101. In a case where the overcurrent detection unit 303 stops notifying that the current equal to or greater than the threshold is flowing, the overcurrent detection notification unit 304 stops outputting the overcurrent detection signal 270.

The overheating shutoff unit 305 is an overheating detection unit and is a circuit that makes a notification to the switch control unit 301 in a case where the temperature of the power supply unit 221 becomes equal to or higher than a predetermined temperature, such as a case where an overcurrent regulation state continues. In a case where the switch control unit 301 is notified by the overheating shutoff unit 305 that the temperature of the power supply unit 221 becomes equal to or higher than the predetermined temperature, the switch control unit 301 controls the switch unit 300 to be in a non-conducting state.

The output discharge unit 306 controls the output power in the USB downstream power 231 to be discharged upon the receipt of the notification from the switch control unit 301. The output discharge unit 306 includes, for example, a switching element such as an FET.

Figure 4:
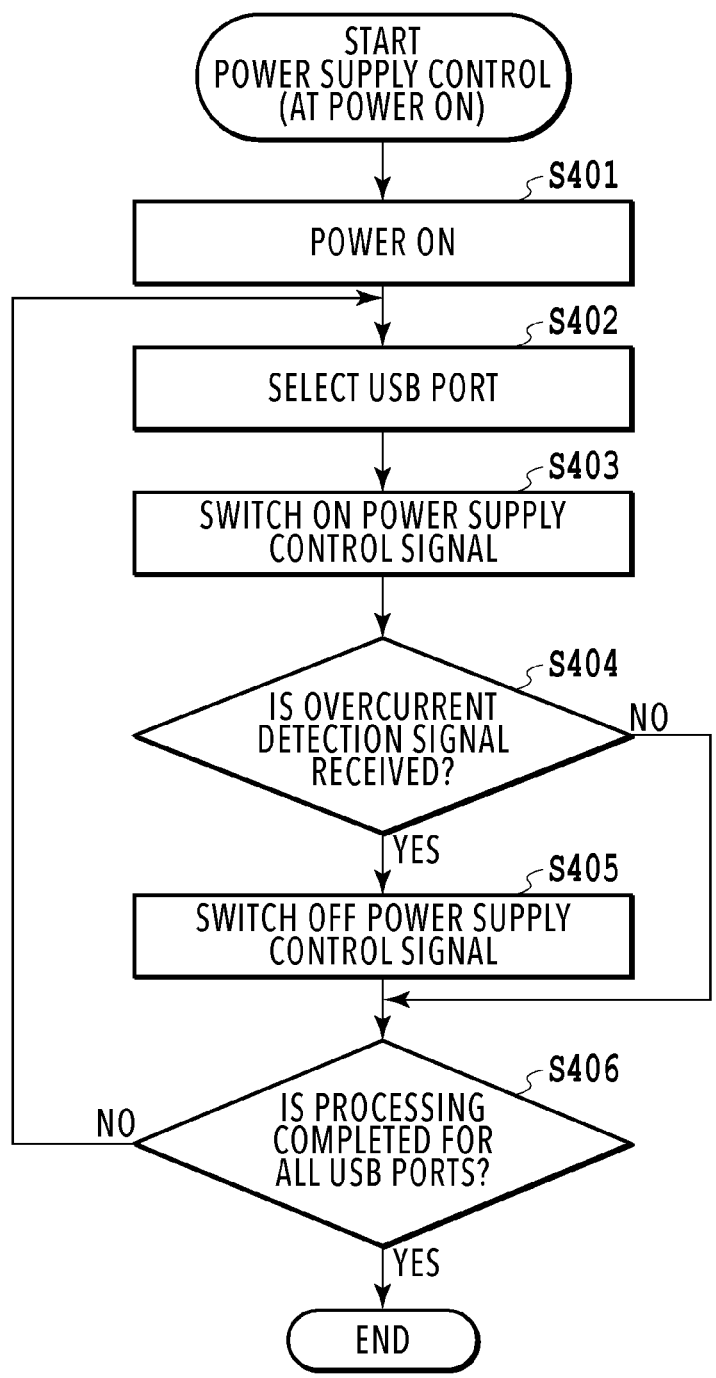
FIG. 4 is a flowchart showing an example of a power supply control procedure according to the embodiment.

FIG. 4 is a flowchart showing a power supply control procedure according to the present embodiment. The flowchart of FIG. 4 shows an example of a control procedure to be performed in a case where the image forming apparatus 100 is powered on. To be more specific, the procedure is suitably performed in a use case where the image forming apparatus 100 is powered on while one or more of the USB ports 241 to 244 are connected to corresponding one or more of the USB devices 261 to 264. The processing of the flowchart shown in FIG. 4 is performed by the SOC 101 loading a program code stored in the storage area into the RAM 103 and executing it. In the description below, the symbol S represents a step in a flowchart. The same applies to the flowchart of FIG. 6. The control procedure will be described below with reference to the flowchart of FIG. 4.

In S401, the power unit 200 starts supplying the USB upstream power 210 to the power supply units 221 to 224 in response to the power on of the image forming apparatus 100.

In S402, the SOC 101 selects a USB port to be a target of overcurrent detection from among the USB ports 241 to 244. In the present embodiment, port numbers are assigned to the USB ports 241 to 244 in advance as identification numbers. The SOC 101 first selects a USB port with the smallest port number and from then on selects USB ports in ascending order. In the first processing in a loop from S402 to S406, the USB port 241 with a port number "1" is selected.

In S403, the SOC 101 switches on a power supply control signal for a power supply unit allocated to the USB port selected in S401. In the first processing of the loop from S402 to S406, the SOC 101 switches on the power supply control signal 251 for the power supply unit 221 allocated to the USB port 241. In response to controlling the power supply control signal 251 to be switched on, the USB downstream power 231 is supplied to the USB device 261 via the USB port 241.

In S404, the SOC 101 determines whether the overcurrent detection signal 270 has been received. If the overcurrent detection signal 270 has not been received (S404: NO), the SOC 101 determines that a current value of a current flowing as the USB upstream power or the USB downstream power is less than the predetermined threshold. For example, in the first processing in the loop from S402 to S406, if the overcurrent detection signal 270 has not been received, the SOC 101 can specify that no overcurrent occurs in the USB port 241.

Figure 5:
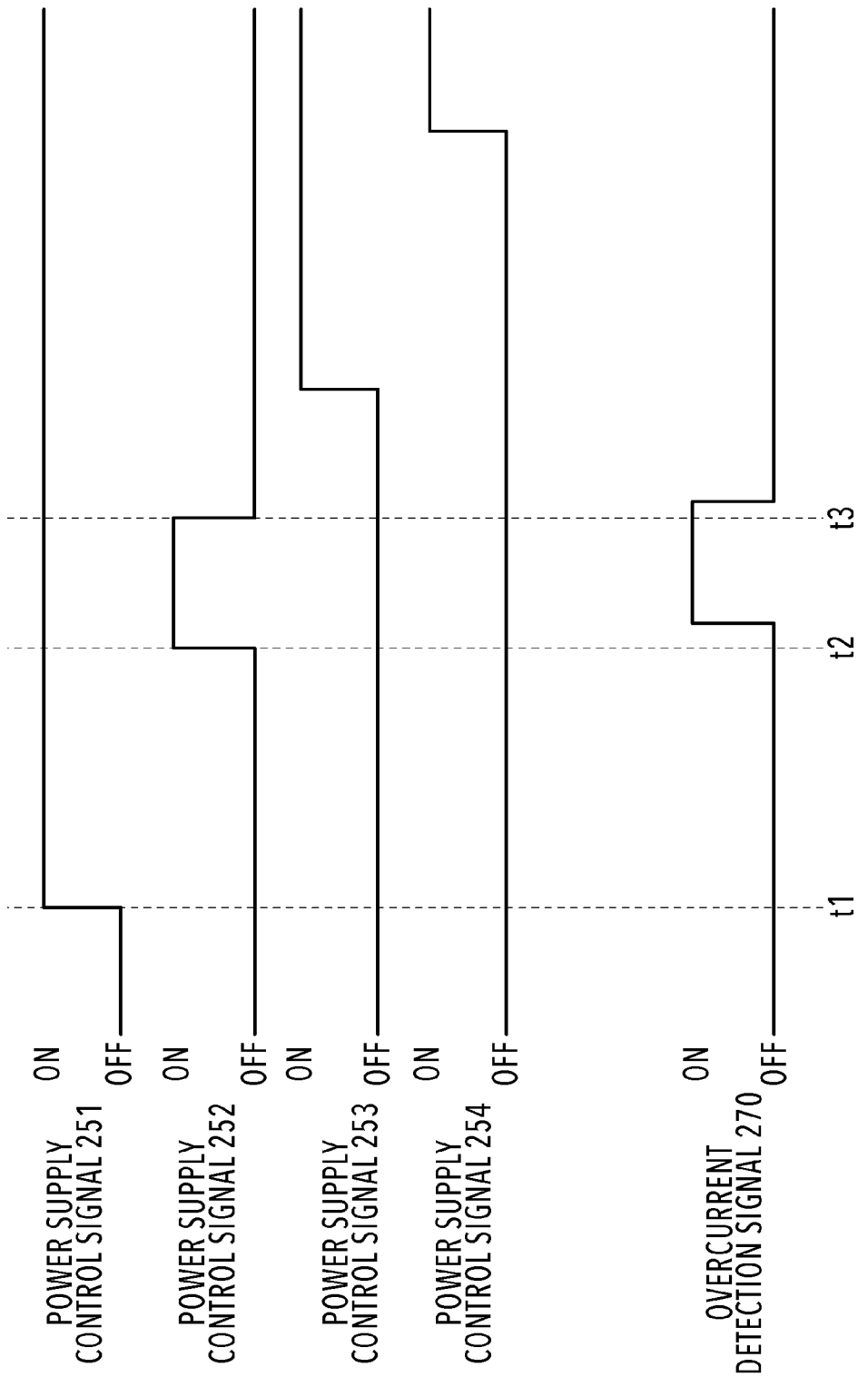
FIG. 5 is a timing chart showing an example of a transition of each signal according to the embodiment.

The timing chart of FIG. 5 shows a transition of each signal in the present embodiment. As shown in the timing chart of FIG. 5, the power supply control signal 251 corresponding to the USB port 241 is switched from off to on at t1. However, the output of the overcurrent detection signal 270 is controlled to be kept off. At this time, the SOC 101 keeps supplying power to the USB port 241 in which no overcurrent occurs.

In contrast, if the overcurrent detection signal 270 has been received (S404: YES), the SOC 101 determines that a current value of a current flowing as the USB upstream power or the USB downstream power is equal to or greater than the predetermined threshold. For example, in the second processing in the loop from S402 to S406, if the overcurrent detection signal 270 has been received, the SOC 101 can specify that overcurrent has occurred in the USB port 242.

As shown in the timing chart of FIG. 5, the power supply control signal 252 corresponding to the USB port 242 is switched from off to on at t2. The timing chart shows that the state of the overcurrent detection signal 270 is changed in response to the switching of the power supply control signal 252 from off to on. That is, the SOC 101 can receive the overcurrent detection signal 270 and specify that overcurrent has occurred in the USB port 242.

If the overcurrent detection signal 270 has been received (S404: YES), the processing advances to S405. In S405, the power supply control signal, which has been switched on in S403, is switched off again by the SOC 101. For example, in the second processing in the loop from S402 to S406, the supply of the USB downstream power 232 from the power supply unit 222 is stopped in response to the switching off of the power supply control signal 252.

As shown in the timing chart of FIG. 5, the power supply control signal 252 corresponding to the USB port 242 is switched from on to off at t3. In response to the switching of the power supply control signal 252 from on to off, the overcurrent detection signal 270 is also switched from on to off. That is, the SOC 101 stops supplying power to the USB port 242 in which overcurrent occurs.

In S406, the SOC 101 determines whether the processing has been completed for all the USB ports. In the present embodiment, the SOC 101 determines whether the processing from S402 to S406 has been performed for all the USB ports 241 to 244. If the processing has not been completed for all the USB ports (S406: NO), the processing returns to S402 to select a USB port to be processed from among unprocessed USB ports. If the processing has been completed for all the USB ports (S406: YES), the flowchart is finished.

Figure 6:
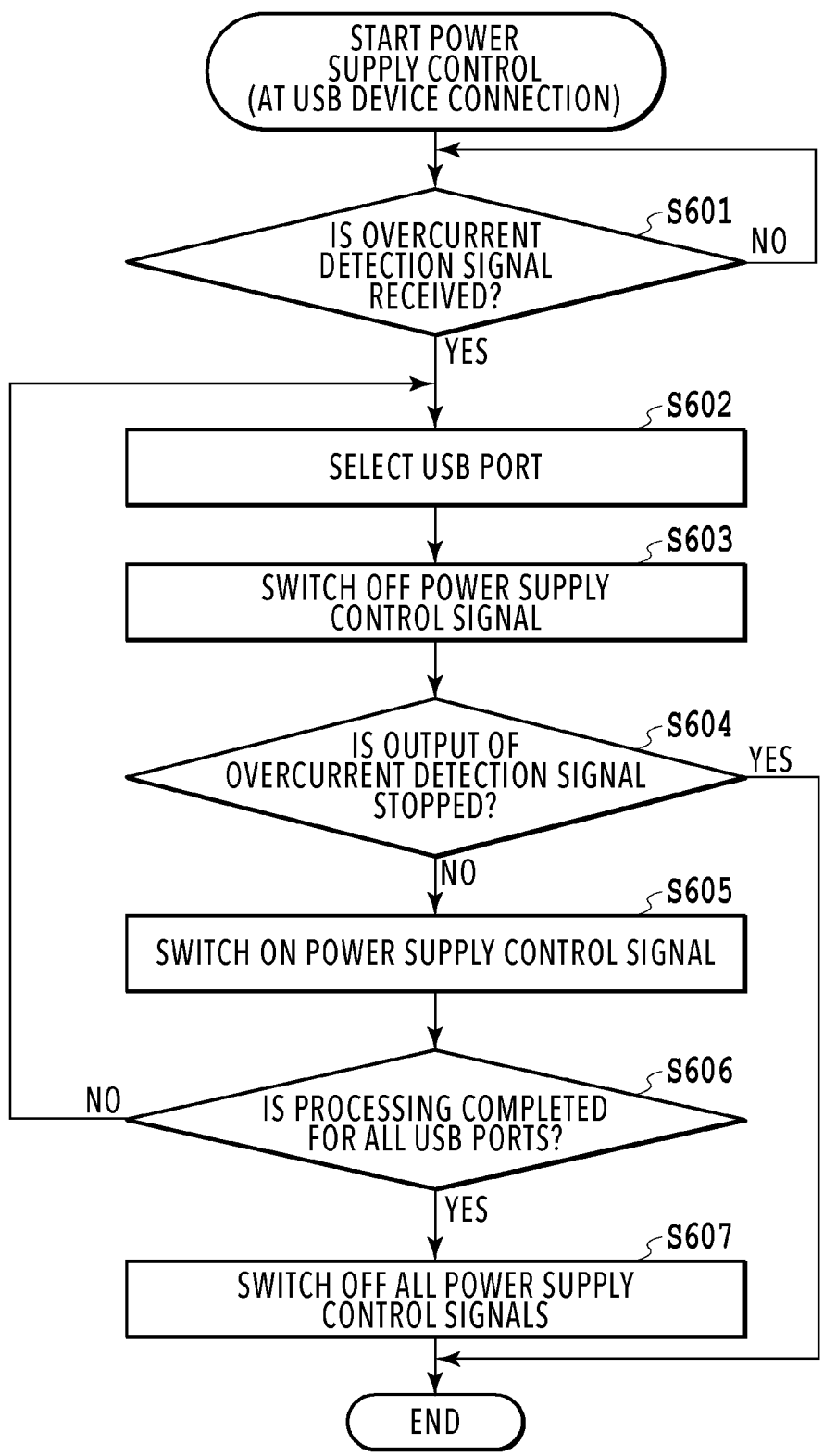
FIG. 6 is a flowchart showing an example of a power supply control procedure according to the embodiment.

FIG. 6 is a flowchart showing an example of a power supply control procedure according to the present embodiment. The flowchart of FIG. 6 shows an example of a control procedure to be performed in a case where the image forming apparatus 100 is controlled to be powered on. To be more specific, the procedure is suitably performed in a use case where one or more of the USB ports 241 to 244 are connected to corresponding one or more of the USB devices 261 to 264 while the image forming apparatus 100 is controlled to be powered on. The example of the control procedure will be described below with reference to the flowchart of FIG. 6.

In S601, the SOC 101 determines whether the overcurrent detection signal 270 has been received. If the overcurrent detection signal 270 has not been received (S601: NO), the processing returns to S601 to repeat the receipt determination of the overcurrent detection signal 270. If the overcurrent detection signal 270 has been received (S601: YES), the SOC 101 determines that a current value of a current flowing as the USB upstream power 210 or the USB downstream power 231 to 234 is equal to or greater than the predetermined threshold. That is, if the overcurrent detection signal 270 has been received, the SOC 101 can recognize that overcurrent has occurred in any of the USB ports 241 to 244.

In S602, the SOC 101 selects a USB port to be a target of overcurrent detection from among the USB ports 241 to 244. In the present embodiment, the SOC 101 first determines whether the USB communication signals 291 to 294 are received and then selects a USB port to be a target of overcurrent detection from among USB ports that do not communicate with the SOC 101. For example, a status management table of the USB ports 241 to 244 shown in FIG. 8 is prestored in the storage area so that the SOC 101 can determine whether each USB port performs communication with reference to the status management table. Regarding the order of selection of the USB ports, the USB ports can be selected in ascending order from the smallest port number like the flowchart of FIG. 4.

In S603, the SOC 101 switches off a power supply control signal corresponding to the USB port selected in S602. For example, in the first processing in a loop from S602 to S606, the supply of the USB downstream power 231 from the power supply unit 221 is stopped in response to the switching of the power supply control signal 251 from on to off.

In S604, the SOC 101 determines whether the output of the overcurrent detection signal 270 has been stopped. If the output of the overcurrent detection signal 270 has not been stopped (S604: NO), the SOC 101 determines that a current having a current value equal to or greater than the threshold has not flowed in the USB port selected in S602. For example, if the output of the overcurrent detection signal 270 has not been stopped in the first processing in the loop from S602 to S606, the SOC 101 can specify that no overcurrent occurs in the USB port 241.

Figure 7:
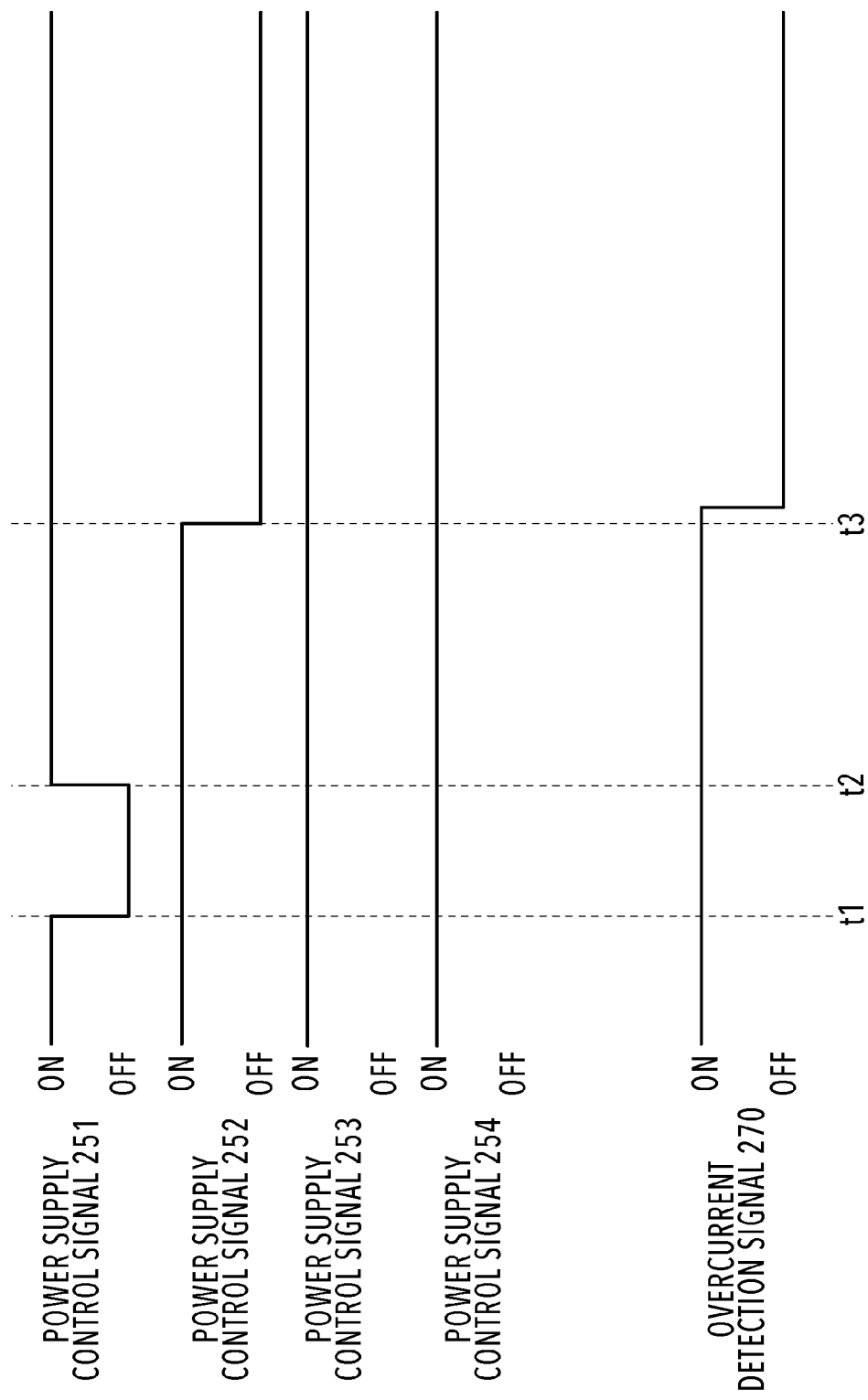
FIG. 7 is a timing chart showing an example of a transition of each signal according to the embodiment.

The timing chart of FIG. 7 shows a transition of each signal in the present embodiment. As shown in the timing chart of FIG. 7, the power supply control signal 251 corresponding to the USB port 241 is switched from on to off at t1. However, the timing chart shows that the state of the overcurrent detection signal 270 remains unchanged. At this time, the SOC 101 can specify that no overcurrent occurs in the USB port 241.

If the output of the overcurrent detection signal 270 has not been stopped (S604: NO), the processing advances to S605. In S605, the power supply control signal, which has been switched off in S603, is switched on again by the SOC 101. For example, in the first processing in the loop from S602 to S606, the supply of the USB downstream power 231 from the power supply unit 221 is restarted in response to the switching on of the power supply control signal 251.

As shown in the timing chart of FIG. 7, the power supply control signal 251 corresponding to the USB port 241 is switched from off to on at t2. In response to the switching of the power supply control signal 251 from off to on, the supply of the USB downstream power 231 from the power supply unit 221 is restarted.

In contrast, if the output of the overcurrent detection signal 270 has been stopped (S604: YES), the SOC 101 determines that a current having a current value equal to or greater than the threshold has flowed in the USB port selected in S602. For example, in the second processing in the loop from S602 to S606, if the output of the overcurrent detection signal 270 has been stopped, the SOC 101 can specify that overcurrent has occurred in the USB port 242. If the output of the overcurrent detection signal 270 has been stopped (S604: YES), the processing exits from the loop from S602 to S606 and the flowchart is finished.

As shown in the timing chart of FIG. 7, the power supply control signal 252 corresponding to the USB port 242 is switched from on to off at t3. In response to the switching of the power supply control signal 252 from on to off, the overcurrent detection signal 270 is also switched from on to off. That is, the SOC 101 can recognize that the output of the overcurrent detection signal 270 has been stopped and specify that overcurrent has occurred in the USB port 242. At this time, the SOC 101 keeps the output of the power supply control signal 252 off and stops the supply of the USB downstream power 231 from the power supply unit 222.

In S606, the SOC 101 determines whether the processing has been completed for all the USB ports. In the present embodiment, the SOC 101 determines whether the processing from S602 to S606 has been performed for all USB ports that do not communicate with the SOC 101. If the processing has not been completed for all the USB ports (S606: NO), the processing returns to S602 to select a USB port to be processed from among unprocessed USB ports. If the processing has been completed for all the USB ports (S606: YES), the SOC 101 determines that no overcurrent occurs in all the USB ports that do not communicate with the SOC 101 and the processing advances to S607.

In S607, the SOC 101 switches off all the power supply control signals 251 to 254 regardless of whether they perform data communication with the SOC 101 and then finishes the flowchart.

As described above, according to the power supply technique described in the present embodiment, even in a case of sharing an overcurrent detection signal, only power supply for a USB port in which overcurrent has occurred can be stopped while maintaining power supply to normally operating USB ports. Therefore, even if the number of terminals in an SOC is limited, overcurrent control can be performed for each USB port.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-245137 filed Dec. 21, 2017, which is hereby incorporated by reference wherein in its entirety.

What is claimed is:

1. An electronic device comprising a plurality of external interfaces and capable of supplying a current to external devices connected via the external interfaces, respectively, the electronic device comprising:
    power supply control units corresponding to the respective external interfaces and each configured to control whether to supply or shutoff a current to the external device and to output a detection of overcurrent supplied to the external device as an overcurrent detection signal; and
    a control unit having (i) a shared terminal for accepting input of an overcurrent detection signal from each of the power supply control units and (ii) respective terminals for outputting, to the power supply control units, a power supply control signal for instructing to control whether to supply or shutoff a current to each of the external devices,
    the control unit being configured to:
    select one of the external interfaces as a target of overcurrent detection in a predetermined order;
    switch output of the power supply control signal for the power supply control unit corresponding to the selected external interface; and
    control the power supply control signal for the power supply control unit corresponding to the selected external interface to be switched off in a case where a state of the common overcurrent detection signal is changed in response to the switching of the output of the power supply control signal.

2. The electronic device according to claim 1, wherein in a case where the input of the common overcurrent detection signal is accepted in response to the switching of the power supply control signal from off to on, the control unit switches the power supply control signal for the power supply control unit corresponding to the selected external interface from on to off.

3. The electronic device according to claim 1, wherein in a case where the common overcurrent detection signal is stopped in response to the switching of the power supply control signal from on to off, the control unit keeps the power supply control signal for the power supply control unit corresponding to the selected external interface switched off.

4. The electronic device according to claim 1, wherein the external interfaces are interfaces compliant with the Universal Serial Bus (USB) standard.

5. The electronic device according to claim 1, wherein the control unit selects an external interface to be a target of overcurrent detection in order of identification numbers assigned to the respective external interfaces.

6. The electronic device according to claim 1, wherein the control unit selects an external interface to be a target of overcurrent detection from among external interfaces that do not communicate with the control unit out of the external interfaces.

7. The electronic device according to claim 1, wherein each of the power supply control units comprises an overcurrent detection unit configured to detect overcurrent in a case where a current equal to or larger than a predetermined threshold is supplied to the external device, and
    in a case where the overcurrent detection unit detects overcurrent, the power supply control unit performs control to supply a current smaller than the predetermined threshold to the external device.

8. The electronic device according to claim 1, wherein each of the power supply control units comprises a low voltage detection unit configured to detect low voltage in a case where input voltage decreases to a predetermined voltage value or less, and
    in a case where the low voltage detection unit detects low voltage, the power supply control unit performs control to shut off a current supplied to the external device.

9. The electronic device according to claim 1, wherein each of the power supply control units comprises an overheating detection unit configured to detect overheating of the power supply control unit, and
    in a case where the overheating detection unit detects overheating, the power supply control unit performs control to shut off a current supplied to the external device.

10. The electronic device according to claim 1, wherein each of the power supply control units comprises an output discharge unit configured to perform control to discharge output power in a case where the power supply control unit performs control to shut off a current supplied to the external device.

11. An electronic device which supplies power to an external device, comprising:
- a plurality of connection ports for connecting a plurality of external devices respectively;
- a power supply for supplying power to the connected external devices through the plurality of connection ports;
- a plurality of switches corresponding respectively to the plurality of connection ports,
  - wherein each switch is arranged between the power supply and a corresponding connection port, and receives a control signal for controlling whether or not to supply power to the connected external device through the corresponding connection port, and supplies, to the connected external device through the corresponding connection port, power having been supplied from the power supply based on the received control signal, detects supplying an overcurrent to the external device and outputs an overcurrent detection signal based on the detection;
- a controller having a plurality of output terminals for outputting, to the plurality of switches, the control signals,
  - wherein the controller has a shared terminal for receiving respective overcurrent detection signals output from the plurality of switches, and outputs, to one of the switches, the control signal to cause the one switch not to supply the power having been supplied from the power supply to an external device through the corresponding connection port if receiving the overcurrent detection signal by the shared terminal.

12. The electronic device according to claim 11, wherein the controller identifies the one switch as a switch outputting the overcurrent detection signal to the shared terminal if the controller does not receive the overcurrent detection signal by the shared terminal after outputting, to the one switch, the control signal to cause the one switch not to supply the power having been supplied from the power supply.

13. A control method of an electronic device comprising a plurality of external interfaces and capable of supplying a current to external devices connected via the external interfaces, respectively, the control method comprising:
- a first output step of outputting, by power supply control units corresponding to the respective external interfaces, a detection of overcurrent supplied to the external devices as an overcurrent detection signal;
- a second output step of outputting, by a control unit having (i) a shared terminal for accepting input of an overcurrent detection signal from each of the power supply control units and (ii) respective terminals for outputting, to the power supply control units, a power supply control signal for instructing to control whether to supply or shutoff a current to each of the external device;
- a selection step of selecting, by the control unit, one of the external interfaces as a target of overcurrent detection in a predetermined order;
- a switching step of switching, by the control unit, output of the power supply control signal to the power supply control unit corresponding to the selected external interface; and
- a control step of controlling, by the control unit, the power supply control signal for the power supply control unit corresponding to the selected external interface to be switched off in a case where a state of the common overcurrent detection signal is changed in response to the switching of the output of the power supply control signal.

* * * * *